(12) United States Patent
Tsubouchi et al.

(10) Patent No.: US 7,370,571 B2
(45) Date of Patent: May 13, 2008

(54) NEGATIVE PRESSURE TYPE BOOSTER DEVICE

(75) Inventors: Kaoru Tsubouchi, Toyota (JP); Yoji Inoue, Toyoake (JP)

(73) Assignee: Advics Co., Ltd., Kariya, Aichi-pref. (JP)

( * ) Notice: Subject to any disclaimer, the term of this patent is extended or adjusted under 35 U.S.C. 154(b) by 154 days.

(21) Appl. No.: 11/447,899

(22) Filed: Jun. 7, 2006

(65) Prior Publication Data

US 2006/0288858 A1 Dec. 28, 2006

(30) Foreign Application Priority Data

Jun. 22, 2005 (JP) ............................. 2005-182114

(51) Int. Cl.
*F15B 9/10* (2006.01)

(52) U.S. Cl. .................................. 91/369.2; 91/376 R

(58) Field of Classification Search ............... 91/369.1, 91/369.2, 369.3, 376 R
See application file for complete search history.

(56) References Cited

U.S. PATENT DOCUMENTS 5,056,413 A 10/1991 Kaub

FOREIGN PATENT DOCUMENTS

JP 6-24922 B2 4/1994
JP 2004-359050 A 12/2004

*Primary Examiner*—Michael Leslie
(74) *Attorney, Agent, or Firm*—Buchanan Ingersoll & Rooney PC

(57) ABSTRACT

In a negative pressure type booster device, secondary passages 53 communicating directly with the atmosphere is formed between the internal surface of a sliding cylindrical portion 8*b* of a valve piston 8 and the external surface of a silencer 27, and communication means 60 is provided for being controlled to vary its path area in dependence on the advance amount of an input rod 23 when the same is moved beyond a predetermined distance relative to the valve piston 8. Thus, when a brake pedal 25 is stepped on strongly, the atmospheric air can be led from the secondary passages 53 through the communication means 60 to a variable pressure chamber 6, so that the property of the responsiveness in braking operation can be improved to a responsiveness enhancing property which varies in dependence on the manner of stepping the brake pedal 25.

10 Claims, 4 Drawing Sheets

NEGATIVE PRESSURE TYPE BOOSTER DEVICE

INCORPORATION BY REFERENCE

This application is claims priority under 35 U.S.C. 119 with respect to Japanese Application No. 2005-182114 filed on Jun. 22, 2005.

BACKGROUND OF THE INVENTION

1. Field of the Invention

The present invention relates to a negative pressure type booster device for vehicles and particularly, to a negative pressure type booster device capable of being highly responsive when a brake pedal is stepped on strongly.

2. Discussion of the Related Art

Generally, in negative pressure type booster devices, when the stepping of a brake pedal advances an input rod which thus causes a plunger to advance relative to a valve piston, a negative pressure valve comes into contact with a negative pressure valve seat to block the communication between a variable pressure chamber and a constant pressure chamber. When the plunger is further advanced then, an atmosphere valve seat is separated from an atmosphere valve, whereby the atmospheric air is led from the surrounding atmosphere to the variable pressure chamber through a silencer and a filter element. Thus, the valve piston is moved forward in dependence on a pressure difference between the variable pressure chamber and the constant pressure chamber to push a master piston, whereby a brake pressure corresponding to the steeping force of the brake pedal is generated in the master cylinder.

Since the valve piston elastically deforms a reaction member by an operation power corresponding to the pressure difference between the variable pressure chamber and the constant pressure chamber to push the master piston, the reaction member under the elastic deformation pushes the plunger rearward. This causes the plunger to retract, so that the atmosphere valve seat is seated on the atmosphere valve to block the communication of the variable pressure chamber with the atmosphere and hence, to hold the brake oil pressure at a desired pressure.

Although it is required to lead the atmospheric air to the variable pressure chamber without delay when the brake pedal is stepped on strongly, the use of the silencer makes it difficult due to an air path resistance thereacross to lead a sufficient volume of the atmospheric air to the variable pressure chamber, and this makes a cause of difficulty in enhancing the responsiveness in braking operation. Particularly, improvement has been required these days with an increasing desire for shortening the time for vehicle to stop after braking.

As one satisfying such desire, there has been known a negative pressure type booster device as described in U.S. Pat. No. 5,056,413 (equivalent of Japanese Examined Published Patent No. 6-24922). In the device described in the patent, a sleeve is provided around a valve housing (valve piston), and an additional annular air passage is defined between the sleeve and the valve housing to open to a rearward chamber (variable pressure chamber). An additional valve member is formed at the rear end of the sleeve and is biased toward a third valve seat so that the same is usually held closed by the additional valve member. When a brake pedal is stepped on sharply to advance an operating member (input rod) beyond a predetermined distance relative to the valve housing, the additional valve member formed at the rear end of the sleeve is separated from the third valve seat. This causes the atmospheric air from a filter element not only to flow into the rearward chamber through an inner space and an intermediate space, but also to flow into the rearward chamber through the additional air passage. As a consequence, the pressure in the rearward chamber rapidly comes to be equal to the atmospheric air, so that the braking responsiveness can be enhanced.

However, in the device described in the aforementioned patent, an additional sleeve defining the additional air passage is provided around the valve housing, and the sleeve is advanced when the brake pedal is stepped a large stroke, whereby the valve member is opened over the entire circumference thereof to admit the atmospheric air from the additional passage. However, since no silencer is provided in the additional air passage for quick admission of the atmospheric air, it would be probable that a throttling noise is made to leak outside when a massive volume of air passes through a throttle portion of an inner valve mechanism at a time upon the rapid opening of the valve member.

In addition, in the device described in the aforementioned patent, since a slight increase in the relative displacement between the sleeve and the valve member after the opening of the valve member brings about a sharp increase in output power, the responsiveness represents the operational modes of two kinds including an ordinary operation state and a responsiveness enhancing valve operation state, thereby giving rise to a problem that there cannot be obtained a responsiveness enhancing property which varies in dependence on the stepping state of the brake pedal.

SUMMARY OF THE INVENTION

Accordingly, it is a primary object of the present invention to provide an improved negative pressure type booster device capable of obtaining a responsiveness enhancing property which varies to meet the magnitude of relative displacement of an input rod to a valve piston which replacement is brought about by the stepping of a brake pedal.

Briefly, according to the present invention, there is provided a negative pressure type booster device, which comprises a booster shell movably supporting a partition member partitioning the interior of the booster shell into a variable pressure chamber and a constant pressure chamber; a valve piston secured to the partition member at a base portion thereof and having a negative pressure valve seat formed thereon for selective communication of the variable pressure chamber with the constant pressure chamber; an output rod connected to the valve piston; a reaction member for transmitting an output of the partition member depending on the pressure difference between the variable and constant pressure chambers, from the valve piston to the output rod; a plunger operable in connection with the reaction member and having an atmosphere valve seat formed thereon; an input rod connected to the plunger for axially moving the plunger when the input rod is axially moved by a brake pedal; a valve member having a negative pressure valve and an atmosphere valve formed thereon, the negative pressure valve being contactable with the negative pressure valve seat of the valve piston for making the variable pressure chamber communicate selectively with the constant pressure chamber, the atmosphere valve being contactable with the atmosphere valve seat of the plunger for making the variable pressure chamber communicate selectively with the atmosphere; and a silencer disposed in a passage for leading the atmospheric air to the atmosphere valve. The negative pressure type booster device further comprises a secondary passage formed between an internal surface of a sliding cylindrical portion of the valve piston and an external surface of the silencer to communicate directly with the atmosphere; and communication means having its path area which is controlled to vary in dependence on a moving amount of the input rod when the same is advanced relative to the valve piston beyond a predetermined distance, so that the atmospheric air from the secondary passage is led to the variable pressure chamber through the communication means.

With this construction, the secondary passage communicating directly with the atmosphere is formed between the internal surface of the sliding cylindrical portion of the valve piston and the external surface of the silencer, and the atmospheric air is led from the secondary passage to the variable pressure chamber by way of the communication means whose path area can be controlled to vary in dependence on the moving amount of the input rod when the same is advanced relative to the valve piston beyond the predetermined distance. Thus, when the brake pedal is stepped on sharply, it can be realized to admit the atmospheric air from the secondary passage without passing through the silencer, so that the responsiveness in braking operation can be enhanced.

In addition, since the path area of the communication means is controlled variably in dependence on the advance amount of the input rod relative to the valve piston, it can be realized to admit the atmospheric air at the flow rate which varies in dependence on the advance amount of the input rod relative to the valve piston. Accordingly, it can be realized to obtain a responsiveness enhancing property which varies in dependence on the manner of stepping the brake pedal and also to suppress any noise from being generated due to the abrupt flowing of the air into the inside valve mechanism.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
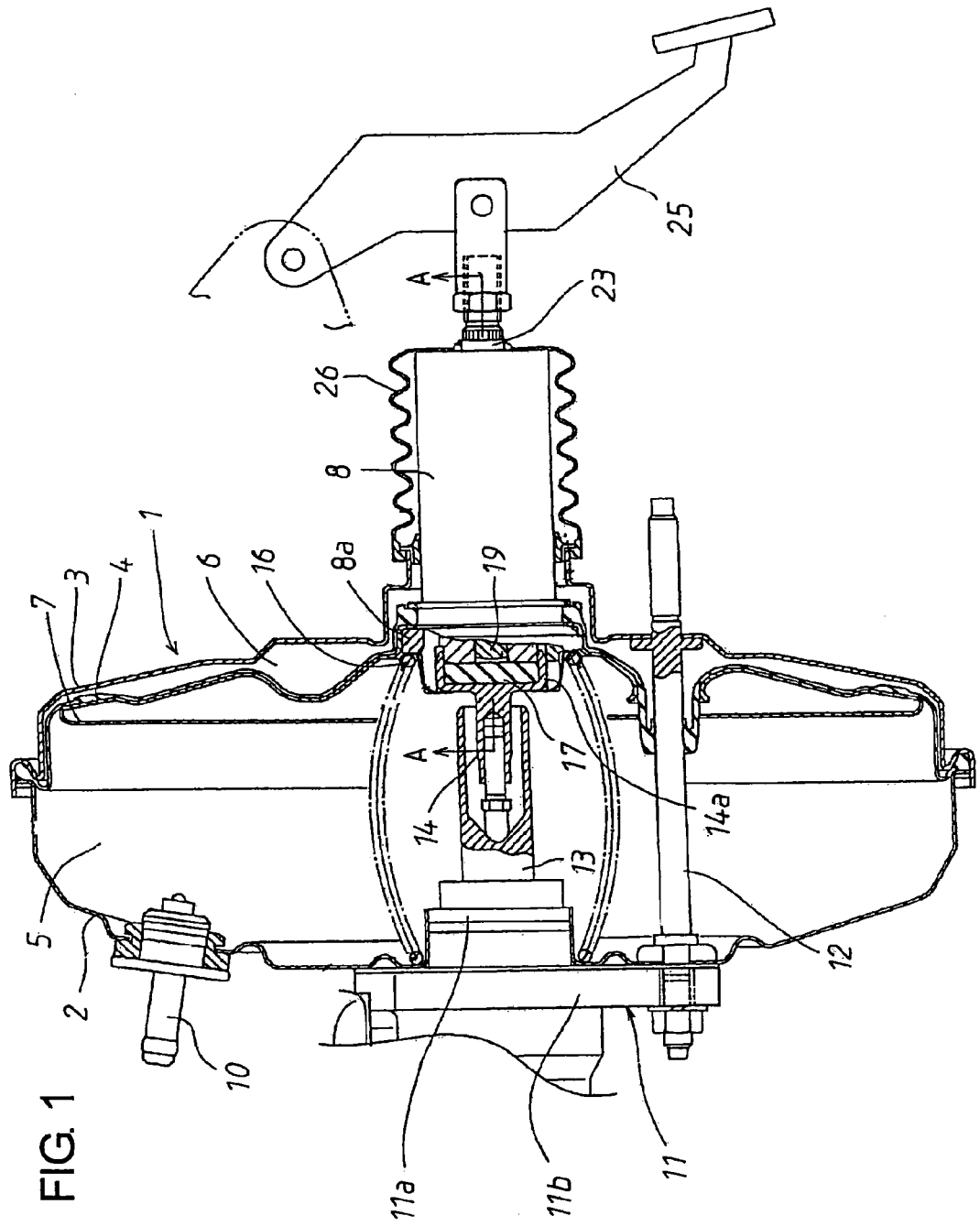
FIG. 1 is a longitudinal sectional view of a negative pressure type booster device in one embodiment according to the present invention.

Hereinafter, a negative pressure type booster device in one embodiment according to the present invention will be described with reference to the accompanying drawings. Referring now to FIG. 1, a booster shell 1 is composed of a front shell 2 and a rear shell 3. Between the both shells 2 and 3, a flexible diaphragm 4 serving as partition member is secured air-tightly at its outer circumferential bead portion and partitions the interior of the booster shell 1 into a constant pressure chamber 5 and a variable pressure chamber 6. A disc-like plate 7 is laminated to the diaphragm 4 within the constant pressure chamber 5. A valve piston 8 is air-tightly secured to the diaphragm 4 and the plate 7 at the outer surface of a base portion 8a thereof and exposes the forward end surface of the base portion 8a to the constant pressure chamber 5. A negative pressure leading conduit 10 is attached to the front shell 2, and the constant pressure chamber 5 is in communication with an intake manifold of a combustion engine (both not shown) through the negative pressure leading conduit 10 thereby to be kept at a predetermined negative pressure during the operation of the combustion engine.

Figure 2:
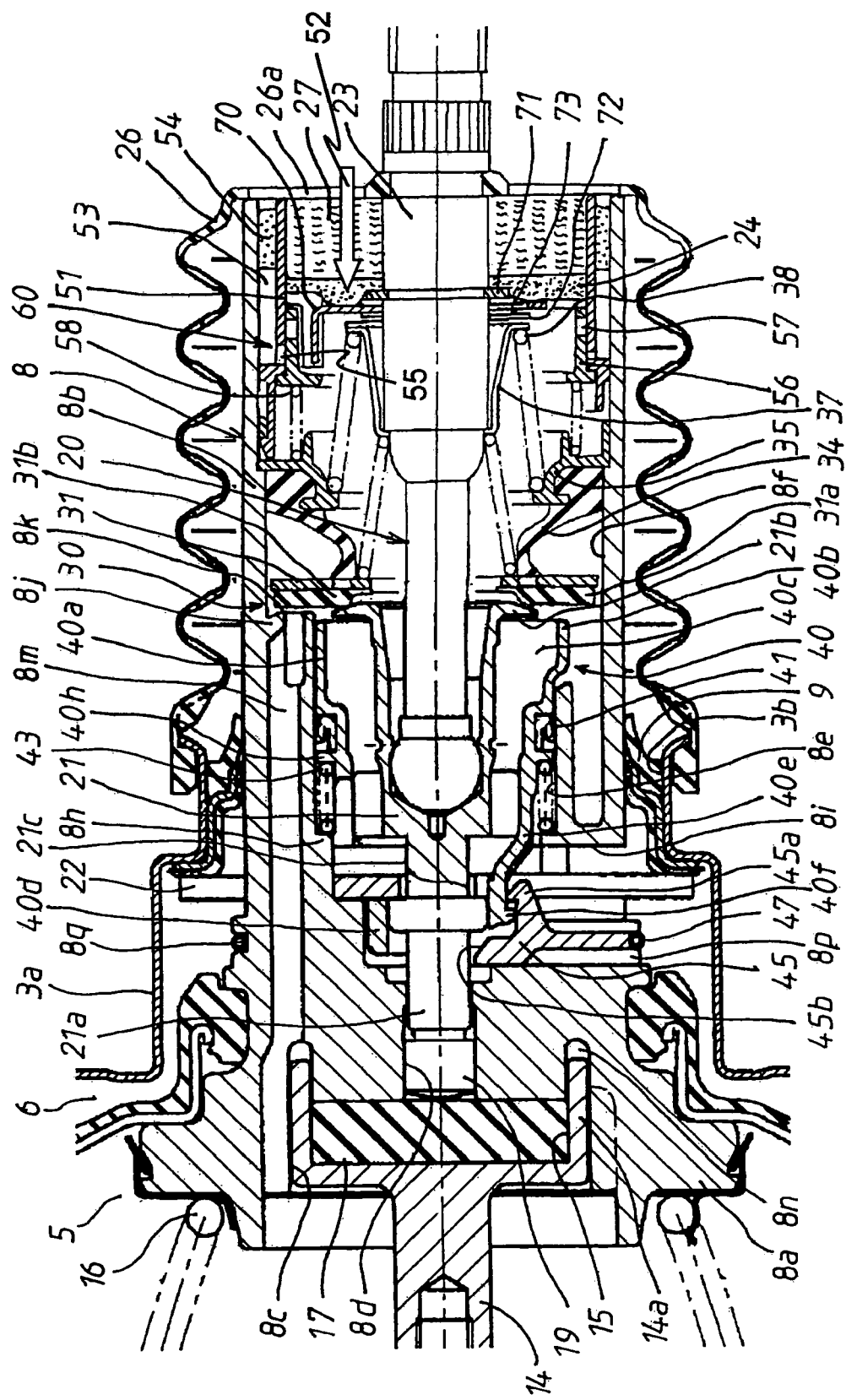
FIG. 2 is an enlarged fragmentary sectional view, taken along the line A-A in FIG. 1, of a valve mechanism section incorporated in the negative pressure type booster device.

As best shown in FIG. 2, the rear shell 3 is bent at its center portion outwardly thereby to protrude a cylindrical protruding portion 3a rearward and has a through hole 3b formed to extend on the axis of the rear shell 3. The valve piston 8 protrudes a sliding cylindrical portion 8b rearward from the base portion 8a, and the sliding cylindrical portion 8b passes through the through hole 3b to protrude rearward from the protruding portion 3a of the rear shell 3. A sealing element 9 is interposed between the internal surface of the through hole 3b and the outer surface of the sliding cylindrical portion 8b to block the variable pressure chamber 6 air-tightly from the atmosphere.

Referring again to FIG. 1, a numeral 11 denotes a master cylinder, which at its rear end portion 11a, passes through a center hole formed at the center portion of the front shell 2 to air-tightly protrude into the constant pressure chamber 5, with a flange portion 11b thereof being in abutting engagement with the forward end surface of the front shell 2. The front shell 2 and the rear shell 3 are joined with each other with several (e.g., two) tie rods 12, each of which extends in parallel with the axis of the booster shell 1 composed of the both shells 2, 3 at almost radial mid position between the axis and the outer surface of the booster shell 1, and are secured to the master cylinder 11. A sliding hole of each sealing portion formed on the diaphragm 4 is fit on each tie rod 12 to be air-tightly slidable therealong as it keeps the air-tight partitioning between the constant pressure chamber 5 and the variable pressure chamber 6.

A master piston 13, which is inserted into the master cylinder 11 slidably in the forward-rearward direction, protrudes from the rear end portion of the master cylinder 11 into the constant pressure chamber 5 to extend close to the forward end of the valve piston 8. An output rod 14 is interposed between the valve piston 8 and the master piston 13. The valve piston 8 transmits the output of the diaphragm 4 depending on the pressure difference between the constant pressure chamber 5 and the variable pressure chamber 6, to the output rod 14 through a reaction member 17 thereby to make the output rod 14 push the master piston 13 forward. A return spring 16 is interposed between the front shell 2 and the forward end surface of the valve piston 8 to urge the same rearward.

As best shown in FIG. 2, a reaction force chamber hole 8c, a reaction force hole 8d opening to the reaction force chamber hole 8c and being smaller in diameter than the reaction force chamber hole 8c, a plunger receiving hole 8e and a valve member receiving hole 8f being larger in diameter than the plunger receiving hole 8e are formed in the valve piston 8 in series from the forward end surface toward the rear end surface of the valve piston 8 on the axis of the same. An annular recess 8n is axially formed in the reaction force chamber hole 8c. An annular protrusion 14a formed at the rear end of the output rod 14 is inserted into the annular recess 8n axially slidably relative to the valve piston 8. Thus, a reaction force chamber 15 is defined between the annular protrusion 14a and the base portion 8a of the valve piston 8, and the disc-like reaction member 17 made of an elastic material is received in the reaction force chamber 15.

Further, a numeral 21 designates a plunger whose forward end rod portion 21a is slidably received in the reaction force hole 8d. The forward end surface of the forward end rod portion 21a is in abutting engagement with the rear end surface of an abutting member 19, which is slidably received in the reaction force hole 8d. An atmosphere valve seat 21b is formed on the rear end surface of the plunger 21.

A numeral 22 denotes a key member taking the shape of "H" letter, and the relative movement amount of the plunger 21 to the valve piston 8 is restricted by the key member 22. Straight portions formed at the opposite sides of the key member 22 have their inner sides which partly get in an annular engaging groove 21c formed on the plunger 21 to be relatively movable by a predetermined amount in the forward-rearward direction. The straight portions of the key member 22 pass through two rectangular holes 8i, which are formed radially between the base end portion 8a and the plunger receiving hole 8e, as they are guided at outer side surfaces thereof along the rectangular holes 8i, and extend both end portions radially outwardly of the valve piston 8. The dimension of the thickness of the key member 22 in the forward-rearward direction is smaller than the dimension of the rectangular holes 8i in the forward-rearward direction, so that the key member 22 is also movable relative to the valve piston 8 by a predetermined amount in the forward-rearward direction. Further, the key member 22 is able to abut on the end surface of the protruding portion 3a of the rear shell 3 at their opposite ends protruding from the external surface of the valve piston 8. Thus, the valve piston 8 and the plunger 21 are able to axially move relative to each other by a limited distance which is determined by subtracting double the thickness of the key member 22 from the sum of the widths in the forward-rearward direction of the rectangular holes 8i and the annular engaging groove 21c.

The rear end of the plunger 21 is connected to an input rod 23 as the same is swingable relative to the plunger 21. The input rod 23 passes through a filter element 24 for preventing dust or the like from going therethrough and a silencer 27 having a noise absorption function, extends rearward beyond the sliding cylindrical portion 8b and is connected to a brake pedal 25 (shown in FIG. 1) in a usual manner. The plunger 21 and the input rod 23 constitute an input member 20 which is axially movable by the brake pedal 25.

A bellows 26 is secured between the input rod 23 and the protruding portion 3a of the rear shell 3 to cover the external surface of the sliding cylindrical portion 8b of the valve piston 8. A plurality of vent holes 26a whose centers are arranged on a circle are opened at the end surface of the bellows 26, and the atmospheric air is admitted from these vent holes 26a into the valve piston 8 through the silencer 27 and the filter element 24.

As shown in FIG. 2, a valve mechanism 30 is further provided for making the variable pressure chamber 6 communicate selectively with the constant pressure chamber 5 and the atmosphere. In the valve mechanism 30, a section portion of a valve receiving hole 8f of the valve piston 8 and a rearward extension portion of the plunger receiving hole 8e define two flat surface portions 8j each taking the shape of a curved, elongate circle, and two first negative pressure valve seats 8k are protruded from the two flat surface portions 8j of the curved, elongate circular shape to be symmetrical with respect to the axis of the valve piston 8. Each first negative pressure valve seat 8k is formed on each flat surface portion 8j and takes the shape of a closed loop ridge or ledge protruding along the circumference of each ellipse which is curved or crooked along an arc having the center on the axis of the valve piston 8. Passages 8m surrounded by the first negative pressure valve seats 8k pass through the side wall of the valve piston 8 to open to the constant pressure chamber 5. A disc-like valve member 31 is loosely received in the valve member receiving hole 8f to be movable in the forward-rearward direction. Formed at the forward end surface of the valve member 31 are first negative pressure valves 31a of a flat shape, which are brought selectively into contact with or separation from the first negative pressure valve seats 8k for bringing the variable pressure chamber 6 selectively into communication with the constant pressure chamber 5 or isolation from the same. The forward end surface of the valve member 31 annually protrudes an atmosphere valve 31b at a portion which is smaller in diameter than the first negative pressure valves 31a. The atmosphere valve 31b is selectively brought into contact with or separation from the atmosphere valve seat 21b, so that the variable pressure chamber 6 is selectively isolated from the atmosphere or is made to communicate with the same.

Figure 3:
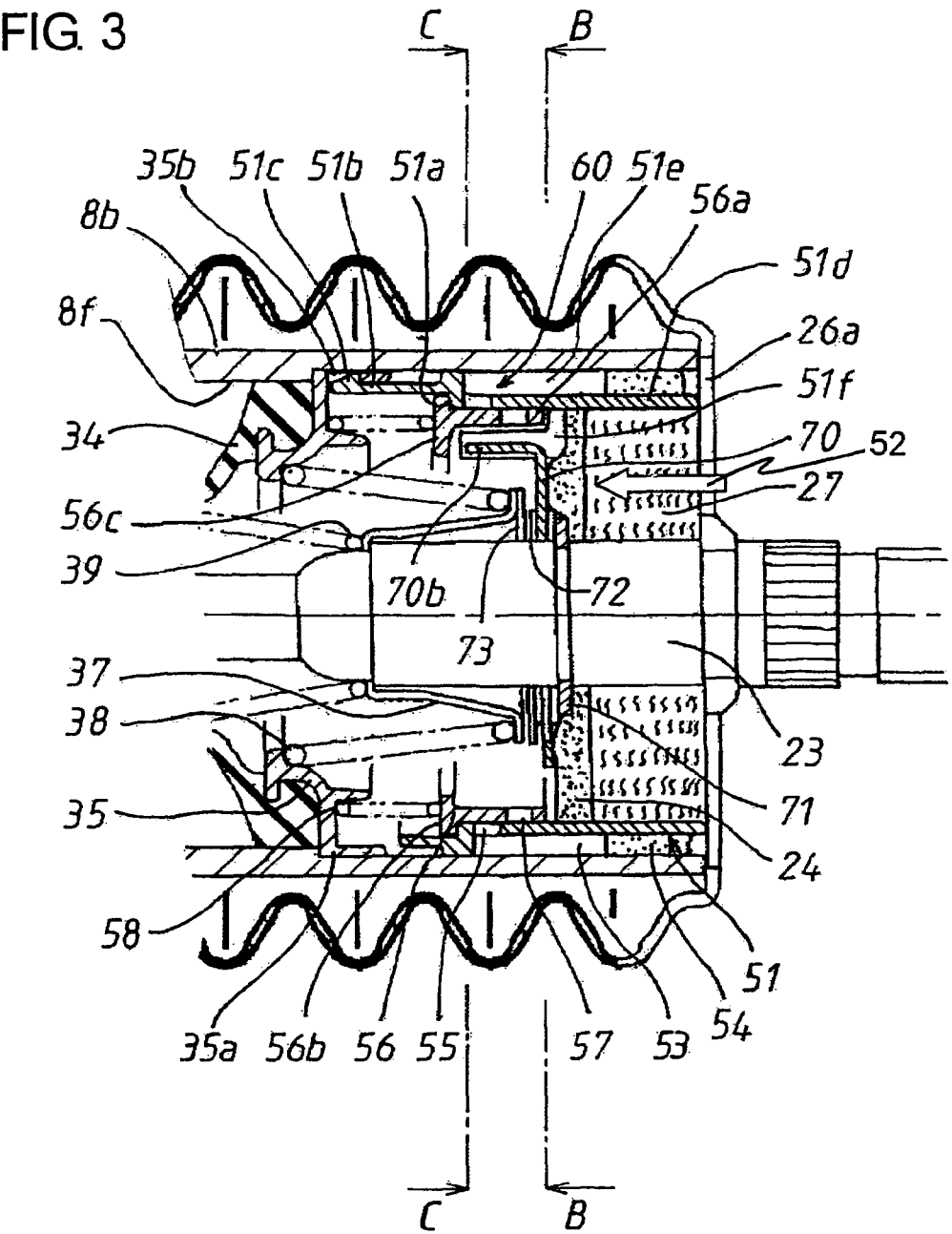
FIG. 3 is an enlarged fragmentary sectional view showing an important portion of the valve mechanism section shown in FIG. 2.

As shown in FIGS. 2 and 3, the rear end of the valve member 31 is connected to an annular holder 35 by means of a bellows 35 which allows the valve member 31 to move in the axial direction. The holder 35 is fitted in the internal surface of the valve member receiving hole 8f and is urged by means of the resilient force of a compression spring 38 which is interposed between itself and a retainer 37 fixedly engaged on the axial mid portion of the input rod 23, to be pressured on a stepped shoulder portion of the valve receiving hole 8f, and the holder 35 is substantially prevented by means of the friction force from rotating relative to the valve piston 8. A skirt portion 35a extending rearward is formed on the holder 35, and engaging holes 35b are formed on the skirt portion 35a to locate at two places in the circumferential direction.

Another compression spring 39 is interposed between the rear end surface of the valve member 31 and the retainer 37 to urge the valve member 31 forward relative to the input rod 23. Thus, in an ordinary state (i.e., the state of non-braking operation), the atmosphere valve 31b is held in contact with the atmosphere valve seat 21b to block the communication of the variable pressure chamber 6 with the atmosphere, and to hold the first negative pressure valves 31a at a position where the first negative pressure valves 31a are slightly separated from the first negative pressure valve seats 8k so that the variable pressure chamber 6 and the constant pressure chamber 5 communicate with each other.

A numeral 40 denotes a valve seat member surrounding the plunger 21, and the rearward cylindrical portion 40a of the valve seat member 40 is axially slidably fit in the internal surface of the plunger receiving hole 8e of the valve piston 8 with a seal element 41 air-tightly provided therebetween. The cylindrical portion 40a of the valve seat member 40 is provided at its rear end with second negative pressure valve seats 40b surrounding the atmosphere valve seat 21b, and in the ordinary state, the second negative pressure valve seats 40b are positioned slightly ahead of the first negative pressure valve seats 8k so that they do not contact with the valve member 31. As shown at the lower-half in FIG. 2, the rear end of the cylindrical portion 40a of the valve seat member 40 is partly expanded in the radial direction at two positions each of which is circumferentially different from the first negative pressure valve seats 8k, that is, circumferentially between the two first negative pressure valve seats 8k, and the second negative pressure valve seats 40b define main air leading portions 40c at the two expanded portions thereof. A compression spring 43 for urging the valve seat member 40 rearward is interposed between an annular protrusion 40h which is protruded at the outer surface of the cylindrical portion 40a of the valve seat member 40 and an annular stepped portion 8h which is formed on the internal surface of the plunger receiving hole 8e.

The valve seat member 40 is provided at its forward end portion with an annular engaging portion 40d which is slidably fit on a large diameter portion formed on the forward end rod portion 21a of the plunger 21. The engaging portion 40d and the cylindrical portion 40a are joined by two linking portions 40e. At the radial opposite sides of the forward end rod portion 21a, the two linking portions 40e are put between the both straight portions of the key member 22 taking the shape of "H" letter and is prevented from coming off in such a manner that a cross beam portion of the key member 22 is held contacted with the outer surface of one of the liking portions 40e while engaging portions formed inner sides of the both straight portions are held engaged with the outer surface of the other liking portion 40e. Thus, the valve seat member 40 is prevented by the key member 22 from rotation, so that the pair of air leading portions 40c are held at the same angular phase as the key member 22 to be located between the two first negative pressure valve seats 8k in the circumferential direction. The two liking portions 40e pass through cutouts formed on the annular stepped portion 8h and through communication grooves to extend from the plunger receiving hole 8e to the rectangular holes 8i. The communication grooves are axially formed at a fitting portion of the plunger 21 which is fit in the annular stepped portion 8h.

Within the valve piston 8, latch member receiving grooves 8p forming two radially opposed flat surfaces are formed ahead of the rectangular holes 8i at two places in the circumferential direction, and latch members 45 are held within the latch member receiving grooves 8p to be movable radially. The latch members 45 are provided with claw potion 45a, which are engageable with engaging protrusions 40f formed at the forward end of the valve seat member 40, respectively. By the engagements of the latch members 45 with the valve seat member 40, the valve seat member 40 is held to take such an ordinary position thereof that the second negative pressure valve seats 40b separate forward from the valve member 31, against the resilient force of the compression spring 43. A garter spring 47 received in an annular groove 8q formed on the valve piston 8 is engaged with the radial outer ends of the latch members 45, so that the latch members 45 are urged by the garter spring 47 toward the radial inward direction to make the claw portions 45a engage respectively with the engaging protrusions 40f.

A cam surface 45b is formed on the internal surface of each latch-member 45. When the plunger 21 is moved forward beyond the predetermined distance relative to the valve piston 8, the plunger 21 is brought into engagements with the cam surfaces 45b to push the latch members 45 radially outward against the urging force of the garter spring 47, so that the claw portions 45a can be disengaged from the engaging protrusions 40f.

The valve seat member 40 disengaged form the latch members 45 is again brought into the engagements to be held at the ordinary position when the valve seat member 40 is advanced relative to the valve piston 8 in the state that the plunger 21 has not been moved forward beyond the predetermined distance relative to the valve piston 8. When the valve piston 8 is moved rearward by the resilient force of the return spring 16 after the key member 22 is brought into abutting engagement with the stepped inner surface of the protruding portion 3a of the rear shell 3 with the rear end of the engaging portion 40d of the valve seat member 40 being in abutting contact on the key member 22, the valve seat member 40 is moved forward relative to the valve piston 8 to bring the forward end surface of each engaging protrusion 40f into engagement with the rear end of each claw portion 45a. Thus, the engaging protrusions 40f get through the claw portions 45a as they forcibly open the claw portions 45 against the resilient force of the garter spring 45, whereby the engaging protrusions 40f are again brought into engagements with the claw portions 45a to hold the valve seat member 40 at the ordinary position.

As best shown in FIG. 3, at the opening portion of the sliding cylindrical portion 8b of the valve piston 8, a cylindrical member 51 having an intermediate stepped portion 51a is arranged between the internal surface of the sliding cylindrical portion 8b and the external surfaces of the filter element 24 and the silencer 27. Resiliently deformable portions 51b each given a resilient force in the radial outward direction are formed at the forward end portion of the cylindrical member 51 at plural places in the circumferential direction. The resilient deformable portions 51b are provided at the forward ends thereof with hooks 51c, which are engaged with the engaging holes 35b formed on the skirt portions 35a of the holder 35, respectively. Thus, by the engagements of the hooks 51c with the engaging holes 35b, the cylindrical member 51 is prevented from moving relative to the holder 35 in the circumferential direction as well as in the axial direction.

An annular wall 51d extends rearward from the intermediate stepped portion 51a of the cylindrical member 51. The annular wall 51d is fitted on the external surfaces of the filter element 24 and the silencer 27. The external surface of the annular wall 51d is provided thereon with a plurality of circumferential ribs 51e, which are circumferentially arranged to contact with the internal surface of the sliding cylindrical portion 8b, and secondary passages 53 are constituted by the spaces between the circumferential ribs 44a to communicate directly with the atmosphere through the air holes 26a.

Another filter element 54 is provided in the secondary passages 53 defined between the external surface of the annular wall 51d and the internal surface of the sliding cylindrical portion 8b. Being smaller in air path resistance than the silencer 27, the filter element 54 is not only capable of admitting the atmospheric air easily to the secondary passages 53, but also capable of reliably preventing dust or the like form entering. Thus, the secondary passage 53 is less in path resistance than a passage or main passage 52 which is defined in the internal surface of the cylindrical member 51 to pass through the filter element 24 and the silencer 27.

Figure 5:
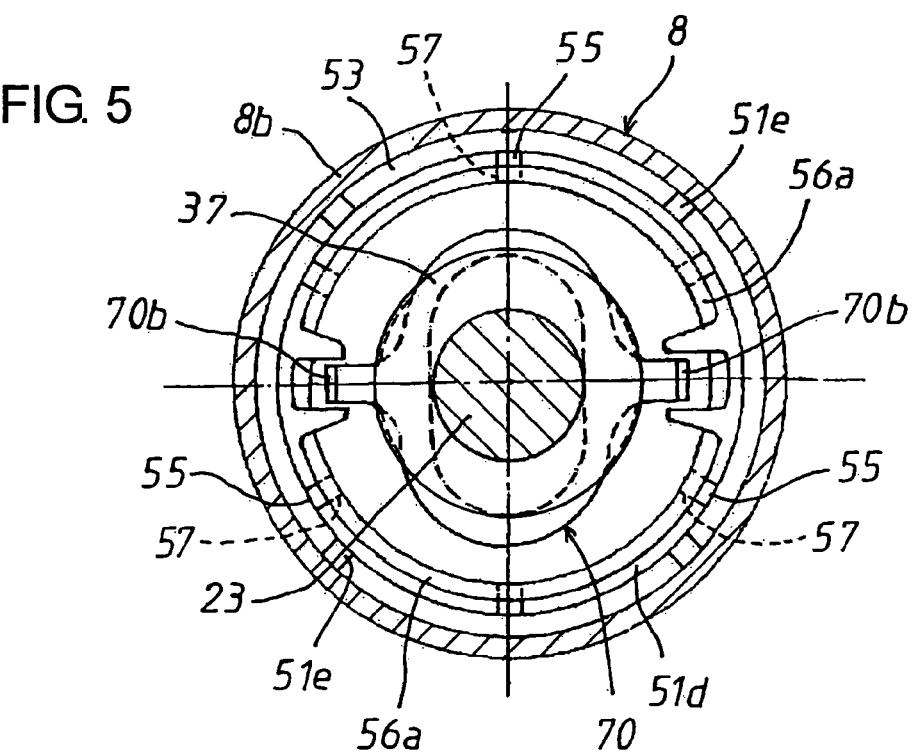
FIG. 5 is a cross-sectional view, taken along the line C-C in FIG. 3, of the valve mechanism section.

A plurality of first communication holes 55 which radially pass through the annular wall 51d are formed at equiangular intervals in the circumferential direction as shown in FIG. 5, and the first communication holes 55 always communicate with the secondary passages 53. On the internal surface of the annular wall 51d, a cylindrical portion 56a of a bypass valve member 56 is inserted to be only slidable through the engagements between protruding portions and slits. A plurality of circumferentially arranged second communication holes 57 radially pass through the cylindrical portion 56a at the same angular phases as the first communication holes 55 to be able to communicate respectively with the first communication holes 55. Annular engaging protruding portion 56b engageable with the intermediate stepped portion 51a is formed at the forward end portion of the bypass valve member 56, and the bypass valve member 56 is ordinarily held by the resilient force of a compression spring 58 which is interposed between itself and the holder 35, at a position where the engaging protruding portion 56b abuts on the intermediate stepped portion 51a. In this state, that is, in the state that the engaging protruding portion 56b of the bypass valve member 56 abuts on the intermediate stepped portion 51a, the second communication holes 57 are away from the first communication holes 55 in the axial direction, so that the communications of the first communication holes 55 with second communication holes 57 are blocked. However, when the bypass valve member 56 is advanced against the resilient force of the compression spring 58, the first communication holes 55 are made to communicate respectively with the second communication holes 57 through path areas which vary in dependence on the moving amount of the bypass valve member 56.

Therefore, the first communication holes 55 and the second communication holes 57 constitute communication means 60 whose path area can be variably controlled in dependence on the advance amount of the input rod 23 relative to the valve piston 8, as described later.

Figure 4:
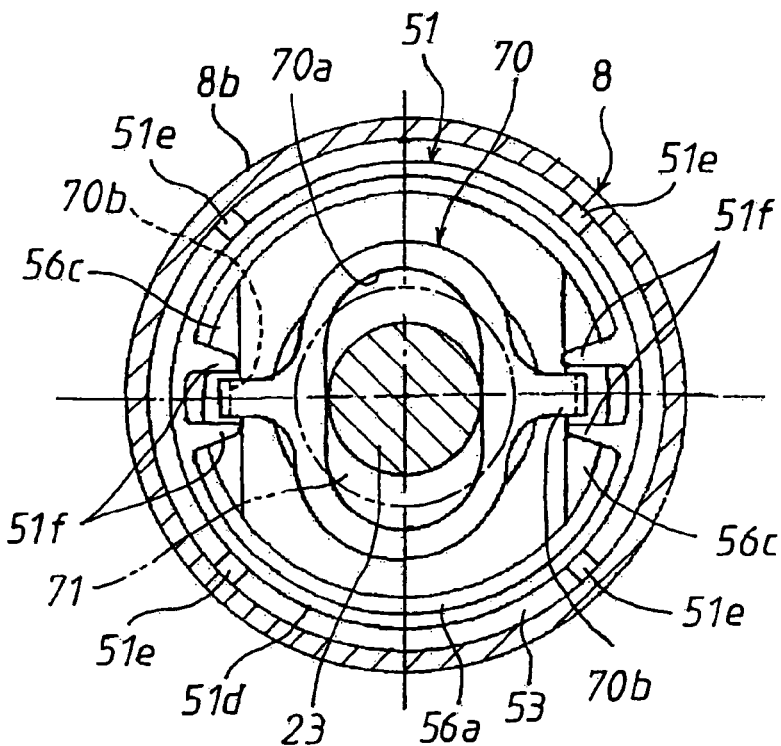
FIG. 4 is a cross-sectional view taken along the line B-B in FIG. 3 of the valve mechanism section.

An operating member 70 for operating the bypass valve member 56 is interposed between a snap ring 71 fixedly engaged on the input rod 23 and the rear surface of the retainer 37. A waved washer 72 is interposed between the operating member 70 and the rear surface of the retainer 37. The operating member 70 is brought by the resilient force of the waved washer 72 into abutting contact with the snap ring 71 through a washer 73 so that the rear end position thereof is restrained. As shown in FIG. 4, the operating member 70 has a guide hole or aperture 70a formed therein and taking an elliptical form which is slender to elongate in a first diametrical direction (i.e., the vertical direction as viewed in FIG. 4) for the swing motion of the input rod 23 effected by the brake pedal 25 and which has approximately the same dimension as that of the input rod 23 in the left-right direction (i.e., in a second diametrical direction). By the provision of the guide aperture 70a, the input rod 23 is allowed to swing in the first diametrical direction, but is restrained not to move in the second diametrical direction perpendicular to the first diametrical or swing motion direction.

Further, two operating portions 70b protruding distal ends thereof forward are formed on the operating member 70 and remain to face the rear surface of the bypass valve member 56 with a predetermined space therebetween at the time of the non-braking operation or the ordinary braking operation. As shown in FIG. 4, the operating portions 70b radially extend in the second diametrical direction perpendicular to the first diametrical direction for the swing motion of the input rod 23, and the radial outer ends of the operating portions 70b are bent and oriented toward the rear surface of the bypass valve member 56 to face the rear surface of the bypass valve member 56. Receiving portions 56c whose each width in the radial direction is narrowed are formed at two places on the internal surface of the bypass valve member 56, and the bent outer ends of the operating portions 70b are engaged respectively with the receiving portions 56c.

A pair of inner ribs 51f for circumferentially sandwiching the outer end of each operating portion 70b therebetween from opposite sides with a clearance are formed at each of the two places on the internal surface of the cylindrical member 51. The pairs of the inner ribs 75 constitute position restraining portions which axially slidably guide the operating member 70 relative to the cylindrical member 51, but restrains the position of the operating member 70 in the circumferential direction. Accordingly, although the compression spring 58 applies a rotational moment to the operating member 70, the same can be prevented from moving in the circumferential direction, so that it becomes possible to keep the swing motion of the input rod 23 stably.

In this manner, the operating member 70 is prevented by the cylindrical member 51 from being rotated relative to the holder 35, whereas the holder 35 is substantially prevented by the friction force from being rotated relative to the valve piston 8. Thus, the operating member 70 is assembled with itself being positioned relative to the valve piston 8 in the circumferential-direction.

(Operation)

The operation of the negative pressure type booster device as constructed above in the foregoing embodiment will be described hereinafter. At the time of an ordinary operation of the brake pedal 25, the input rod 23 and the plunger 21 are advanced by the stepping of the brake pedal 25 against the resilient force of the compression spring 38, and the valve member 31 is advanced by the resilient force of the compression spring 39. This brings the first negative pressure valves 31a respectively into contact with the first negative pressure valve seats 8k thereby to block the communication between the variable pressure chamber 6 and the constant pressure chamber 5. As the plunger 21 is advanced further, the atmosphere valve seat 21b is separated from the atmosphere valve 31b, whereby the atmospheric air admitted into the valve piston 8 through the silencer 27 and the filter element 24 is flown into the variable pressure chamber 6 through the atmosphere valve 31b.

Thus, a pressure difference is generated between the variable pressure chamber 6 and the constant pressure chamber 5, and the diaphragm 4, the plate 7 and the valve piston 8 are moved forward due to the pressure difference thereby to advance the output rod 14 through the reaction member 17. Accordingly, the master piston 13 is pushed forward by the output rod 14, so that pressurized brake oil is generated in the master cylinder 11 in dependence on the stepping force exerted on the brake pedal 25.

In the aforementioned ordinary operation of the brake pedal 25, the moving amount of the input member 20 relative to the valve piston 8 is small, and it does not take place that the bypass valve member 56 is operated by the operating portions 70b of the operating member 70, so that the communications of the first communication holes 55 with the second communication holes 57 remain blocked. Further, the valve seat member 40 and the latch members 45 remain in the engaged state shown in FIG. 2, and the second negative pressure valve seats 40b remain separated from the valve member 31.

The valve piston 8 elastically deforms the reaction member 17 by the operating force which corresponds to the pressure difference between the both chambers 5, 6 acting on the diaphragm 4 and pushes the master piston 13 through the reaction member 17 and the output rod 14. When elastically deformed, the reaction member 17 is partly flown into the reaction force hole 8d thereby to push the forward end of the forward end rod portion 21a of the plunger 21 rearward through the abutting member 19. Thus, the plunger 21 is retracted relative to the valve piston 8 to make the atmosphere valve seat 21b take seat on the atmosphere valve 31b, whereby the communication of the variable pressure chamber 6 with the atmosphere is blocked to hold a desired pressure of the brake oil. During this operation, the force exerted on the brake pedal 25 is transmitted from the forward end rod portion 21a of the plunger 21 to the reaction member 17 through the input rod 23. Since the reaction member 17 is elastically deformed in dependence on the stepping force, the driver can feel a reaction force corresponding to the deformation of the reaction member 17.

When the brake pedal 25 is released after the braking operation, the plunger 21 together with the input rod 23 is moved by the resilient force of the compression spring 38 rearward relative to the valve piston 8. Thus, the plunger 21 brings the atmosphere valve seat 21b into contact with the atmosphere valve 31b and moves the valve member 31 rearward relative to the valve piston 8 against the resilient force of the compression spring 39, whereby the first negative pressure valves 31a are separated from the first negative pressure valve seats 8k. As a result, the negative pressure in the constant pressure chamber 5 is led to the variable pressure chamber 6 by way of the communication passages 8m to make zero the pressure difference between the variable pressure chamber 6 and the constant pressure chamber 5. Therefore, the valve piston 8, the plate 7 and the diaphragm 4 are moved rearward by the resilient force of the return spring 16 provided in the booster shell 1, and with the rearward movement of the diaphragm 4, the master piston 13 is moved rearward by the resilient force of a compression spring (not shown) to be returned to the origin with the result that no pressure of the brake oil is generated in the master cylinder 11.

The plunger 21 is stopped at the same time as the key member 22 is brought into contact with the stepped internal surface of the protruding portion 3a of the rear shell 3, while the valve piston 8 is stopped in contact with the key member 22. Thus, while the brake is not being applied, the first negative pressure valves 31a remain very close to the first negative pressure valve seats 8k, so that when the brake begins to be applied then, the first negative pressure valves 31a can quickly come into contact with the first negative pressure valve seats 8k as soon as the valve member 31 is moved forward.

When the brake pedal 25 is stepped on strongly or sharply, on the contrary, the input rod 23 is advanced relative to the valve piston 8 through a longer distance than it is done at the time of the ordinary braking. When the input rod 23 is advanced beyond a predetermined distance relative to the valve piston 8, the operating portions 70b of the operating member 70 push the bypass valve member 56 forward against the resilient force of the compression spring 58. Thus, the cylindrical portion 56a of the bypass valve member 56 is slidden on the annular wall 51d of the cylindrical member 51. As a result, the second communication holes 57 begin to communicate respectively with the first communication holes 55, and the path area of the communication means 60 constituted by these holes 55, 57 is controlled to vary in dependence on the advance amount of the input rod 23 relative to the valve piston 8.

Accordingly, besides the atmospheric air which flows into the variable pressure chamber 6 through the silencer 27, the filter element 24 and the atmosphere valve 31b in the same manner as described above, the atmospheric air which does not pass through the silencer 27 is directly admitted from the secondary passages 53 through the communication means 60 into the valve piston 80, and the atmospheric air so admitted flows into the variable pressure chamber 6 by way of the atmosphere valve 31b. At this time, since the path area of the communication means 60 is controlled to vary in dependence on the displacement amount of the input member 20 relative to the valve piston 8, the atmospheric air admitted by way of the communication means 60 is increased gradually as the displacement amount of the input member 20 relative to the valve piston 8 is increased.

In this way, since when the brake pedal 25 is stepped on strongly or sharply, the atmospheric air is admitted without passing through the silencer 27 having a flow path resistance and through the path area which varies in dependence on the displacement amount of the input member 20 relative to the valve piston 8, the atmospheric air of the volume which is determined in dependence on the stepping amount of the brake pedal 25 can be led to the variable pressure chamber 6 without delay. Accordingly, it can be realized to enhance the responsiveness in operation at the time of the sharp braking and to prevent any noise from being generated due to the abrupt admission of the atmospheric air. In addition, since the operating force of the input rod 23 pressures the valve piston 8 through the compression spring 58, it can be realized to suppress the valve piston 8 from vibrating at an early stage that the atmospheric air is admitted.

Further, since the inner ribs (position restraining portions) 51f provided in the cylindrical member 51 which is circumferentially positioned relative to the valve piston 8 serve to prevent the operating member 70 from rotating in the circumferential direction, the swing motion of the input rod 23 given by the manipulation of the brake pedal 25 can be allowed reliably and stably. As a consequence, it becomes possible to perform the open/close motions of the first negative pressure valves 31a and the atmosphere valve 31b stably over a log period of time, and hence, the braking performance can be maintained stably.

Next, description will be made regarding the operation at the time of an emergency braking wherein the driver steps the brake pedal 25 quickly. The emergency braking property can be accomplished by varying the jumping property so that a larger propelling force than that at the time of the ordinary braking is exerted on the output member 14. In order to vary the jumping property, it can be done to take a larger clearance between the abutting member 19 and the reaction member 17. That is, by shifting the atmosphere valve 31b rearward, the clearance can be enlarged to increase the output power which is applied until the abutting member 19 comes to receive the reaction force from the reaction member 17. Thus, the output power in a so-called jumping state wherein the ratio of the output power to the input power becomes infinity is made to be larger than that in the ordinary state.

The jumping property in which the ratio of the output power to the input power becomes infinity is determined in dependence upon a distance through which the plunger 21 is advanced from the time that the atmosphere valve seat 21b begins to separate from the atmosphere valve 31b with the first negative pressure valves 31a being in contact with the first negative valve seats 8k, by the time that the abutting member 19 is brought into contact with the reaction member 17. At the time of emergency braking, because the second negative valve seats 40b are brought into contact with the valve member 31, to move the valve member 31 rearward, the distance through which the plunger 21 is advanced from the time that the atmosphere valve seat 21b begins to separate from the atmosphere valve 31b by the time that the abutting member 19 comes to contact with the reaction member 17 becomes longer than that at the time of ordinary braking, and the distance by which the atmosphere valve seat 21b is separated from the atmosphere valve 31b during the same period of time becomes long. Thus, the variable pressure chamber 6 is caused to communicate with the atmosphere compulsorily and quickly, whereby a larger propelling force than that at the time of ordinary braking is outputted to the output member 14 to heighten the jumping property.

As described earlier, at the time of the emergency braking wherein the driver steps the brake pedal 25 quickly, the plunger 21 is advanced beyond the predetermined distance relative to the valve piston 8. Thus, the large diameter portion of the forward end rod portion 21a of the plunger 21 pushes the cam surfaces 45b of the latch members 45 to disengage the claw portions 45a from the engaging protrusions 40f. As a result, the latch members 45 are pushed radially outward against the resilient force of the garter spring 47, and hence, the valve seat member 40 is released from the latch members 45. This allows the valve seat member 40 to retract the predetermined amount rearward by means of the resilient force of the compression spring 43, and the second negative pressure valve seats 40b are brought into contact with the valve member 31 to retract the same, whereby the atmosphere valve 31b is separated from the atmosphere valve seat 21b. The retraction of the valve seat member 40 relative to the valve piston 8 is restricted when the rear end of the engaging portion 40d comes into engagement with the key member 22 remaining in contact with the rear end surfaces of the rectangular holes 8i. Thus, the variable pressure chamber 6 is caused to communicate with the atmosphere compulsorily and quickly, whereby the larger propelling force than that at the time of ordinary braking is outputted to the output member 14 with the result that a higher pressure is delivered from the master cylinder. With the increase of the output power, the reaction member 17 partly flows into the reaction force hole 8d to push the plunger 21 back through the abutting member 19. Thus, the atmosphere valve seat 21b is brought into contact with the atmosphere valve 31b to block the inflow of the atmospheric air, whereby the output power at the time of the emergency braking can be determined.

As mentioned earlier, the atmospheric air is admitted into the valve piston 8 without passing through the silencer 27 and without delay, so that a large braking force can be outputted with a high responsiveness at the time of the emergency braking.

When the brake pedal 25 is released, the resilient force of the compression spring 38 causes the plunger 21 to be moved rearward relative to the valve piston 8 and the valve member 31. The valve member 31 is separated from the first negative pressure valve seats 8k to make the variable pressure chamber 6 communicate with the constant pressure chamber 5. Thus, the output power is lowered to allow the valve piston 8 to be moved rearward by the resilient force of the return spring 16. When the valve piston 8 is retracted rearward by the resilient force of the return spring 16 after the key member 22 is brought into contact with the stepped inner surface of the protruding portion 3a of the rear shell 3, the valve seat member 40 which has been in contact with the key member 22 at the rear end of the engaging portion 40d is advanced relative to the valve piston 8. This brings the forward end surfaces of the engaging protrusions 40f into engagements with the end surfaces of the claw portions 45a. Thus, the latch members 45 are pushed radially outward against the resilient force of the garter spring 47 to allow the claw portions 45a to pass over and after passing, are returned by the resilient force of the garter spring 47 to bring the claw portions 45 into engagements with the engaging protrusion 40f, whereby the valve seat member 40 are latched at the ordinary position.

In the foregoing embodiment, since the communication means 60 is constituted by the plurality of first communication holes 55 circumferentially provided on the cylindrical member 51d arranged around the silencer 27 and the plurality of second communication holes 57 circumferentially provided on the bypass valve member 56 slidably inserted into the cylindrical member 51d and since the first communication holes 55 are able to communicate with the second communication holes 57 variably in dependence on the displacement amount of the input member 20 relative to the valve piston 8, the path area of the communication means 60 which varies in dependence on the displacement amount of the input member 20 relative to the valve piston 8 can be set discretionarily by setting the dimension, shape, number and the like of the communication passages 55, 57 discretionarily, so that it becomes possible to set the responsiveness enhancing property as desired.

In the foregoing embodiment, since the inner ribs (position restraining portions) 51f provided in the cylindrical member 51 which is circumferentially positioned relative to the valve piston 8 prevent the operating member 70 from rotating in the circumferential direction and since the guide aperture 70a allows the input member 20 to swing, the swing motion of the input rod 23 given by the manipulation of the brake pedal 25 can be allowed reliably and stably. Accordingly, it becomes possible to perform the open/close operations of the first negative pressure valves 31a and the atmosphere valve 31b stably over a log period of time, and hence, the braking performance can be maintained stably.

In particular, since the bypass valve member 56 is slidable by the operating member 70 which is operated in dependence on the displacement amount of the input member 20 relative to the valve piston 8 and since the operating member 70 is movable together with the input member 20 in the axial direction, but movable relative to the input member 20 in the swing motion direction, the swing motion of the input member 20 given by the manipulation of the brake pedal 25 can be allowed reliably and stably. As a consequence, it becomes possible to perform the open/close operations of the first negative pressure valves 31a and the atmosphere valve 31b stably over a long period of time.

Although in the foregoing embodiment, description has been made regarding the negative pressure type booster device with an emergency braking function which is capable of outputting a larger brake force than that at the time of ordinary braking by varying the jumping property at the time of emergency braking, the emergency braking function is necessarily not required in practicing the present invention, and the present invention may of course be applicable to a negative pressure type booster device which does not have the emergency braking function. In the modified case, the first negative pressure valve seats 8k and the first negative pressure valve 31a shown in FIG. 2 serve as a negative pressure valve seat and a negative pressure valve in the negative pressure type booster device not having the emergency braking function, while the atmosphere valve seat 21b and the atmosphere valve 31b shown in FIG. 2 serve as an atmosphere valve seat and an atmosphere valve in the negative pressure type booster device not having the emergency braking function.

Although in the foregoing embodiment, description has been made regarding the example wherein the first communication passages 55 and the second communication passages 57 constituting the communication means 60 are composed of a plurality of circumferentially arranged round holes, the dimension, shape, number and the like of the communication passages 55, 57 may be set discretionarily in dependence on how to control the path area of the communication means 60 in connection with the relative displacement of the input member 20 to the valve piston 8.

Obviously, numerous further modifications and variations of the present invention are possible in light of the above teachings. It is therefore to be understood that within the scope of the appended claims, the present invention may be practiced otherwise than as specifically described herein.

What is claimed is:

1. A negative pressure type booster device comprising:
   a booster shell movably supporting a partition member partitioning the interior of the booster shell into a variable pressure chamber and a constant pressure chamber;
   a valve piston secured to the partition member at a base portion thereof and having a negative pressure valve seat formed thereon for selective communication of the variable pressure chamber with the constant pressure chamber;
   an output rod connected to the valve piston;
   a reaction member for transmitting an output of the partition member depending on the pressure difference between the variable and constant pressure chambers, from the valve piston to the output rod;
   a plunger operable in connection with the reaction member and having an atmosphere valve seat formed thereon;
   an input rod connected to the plunger for axially moving the plunger when the input rod is axially moved by a brake pedal;
   a valve member having a negative pressure valve and an atmosphere valve formed thereon, the negative pressure valve being contactable with the negative pressure valve seat of the valve piston for making the variable pressure chamber communicate selectively with the constant pressure chamber, the atmosphere valve being contactable with the atmosphere valve seat of the plunger for making the variable pressure chamber communicate selectively with the atmosphere;
   a silencer disposed in a passage for leading the atmospheric air to the atmosphere valve;
   a secondary passage formed between an internal surface of a cylindrical portion of the valve piston and an external surface of the silencer to communicate directly with the atmosphere; and
   communication means having its path area which is controlled to vary in dependence on a moving amount of the input rod when the same is advanced relative to the valve piston beyond a predetermined distance, so that the atmospheric air from the secondary passage is led to the variable pressure chamber through the communication means.

2. The negative pressure type booster device as set forth in claim 1, wherein the communication means comprises:
   a cylindrical member arranged around the silencer;
   a bypass valve member slidably inserted into the cylindrical member;
   a mechanism for bringing about a relative displacement between the cylindrical member and the bypass valve member in connection with the axial movement of the input rod;
   a first communication hole provided on the cylindrical member; and
   a second communication hole provided on the bypass valve member and being able to communicate with the first communication hole variably in dependence on the displacement of the input rod relative to the valve piston.

3. The negative pressure type booster device as set forth in claim 2, wherein:
   the mechanism comprises an operating member which is operated in dependence on the displacement of the input rod relative to the valve piston to slidably move the bypass valve member; and
   the operating member is movable together with the input rod in the axial direction, but movable relative to the input rod in a swing motion direction of the input rod.

4. The negative pressure type booster device as set forth in claim 2, wherein:
   a plurality of first communication holes including the first communication hole are distributed on the cylindrical member in the circumferential direction; and
   a plurality of second communication holes including the second communication hole are distributed on the bypass valve member in the circumferential direction in the same angular phases as the first communication holes.

5. The negative pressure type booster device as set forth in claim 1, wherein:
   a filter element is provided in the secondary passage, and the filter element is smaller in air path resistance than the silencer.

6. A negative pressure type booster device comprising:
   a booster shell movably supporting a partition member partitioning the interior of the booster shell into a variable pressure chamber and a constant pressure chamber;
   a valve piston fixed to the partition member at a base portion thereof and having a negative pressure valve seat formed thereon for selective communication of the variable pressure chamber with the constant pressure chamber;
   an output rod connected to the valve piston;
   a reaction member for transmitting a movement of the partition member depending on the pressure difference between the variable and constant pressure chambers, from the valve piston to the output rod;
   a plunger operable in connection with the reaction member and having an atmosphere valve seat formed thereon;
   an input rod connected to the plunger for axially moving the plunger when the input rod is axially moved by a brake pedal;
   a valve member having a negative pressure valve and an atmosphere valve formed thereon, the negative pressure valve being contactable with the negative pressure valve seat of the valve piston for making the variable pressure chamber communicate selectively with the constant pressure chamber, the atmosphere valve being contactable with the atmosphere valve seat of the plunger for making the variable pressure chamber communicate selectively with the atmosphere;
   a silencer disposed in a passage for leading the atmospheric air to the atmosphere valve;
   a secondary passage formed between an internal surface of a cylindrical portion of the valve piston and an external surface of the silencer to communicate directly with the atmosphere, the secondary passage having less air path resistance than the passage; and
   communication means for varying a path area between the secondary passage and the variable pressure chamber in dependence on the moving amount of the input rod.

7. The negative pressure type booster device as set forth in claim 6, wherein the communication means comprises:
   a cylindrical member arranged around the silencer;
   a bypass valve member slidably inserted into the cylindrical member;
   a first communication hole provided on the cylindrical member; and
   a second communication hole provided on the bypass valve member and being able to communicate with the first communication hole variably in dependence on the displacement of the input rod relative to the valve piston.

8. The negative pressure type booster device as set forth in claim 7, wherein:
   the mechanism comprises an operating member which is operated in dependence on the displacement of the input rod relative to the valve piston to slidably move the bypass valve member; and
   the operating member is movable together with the input rod in the axial direction, but movable relative to the input rod in a swing motion direction of the input rod.

9. The negative pressure type booster device as set forth in claim 7, wherein:
   a plurality of first communication holes including the first communication hole are distributed on the cylindrical member in the circumferential direction; and
   a plurality of second communication holes including the second communication hole are distributed on the bypass valve member in the circumferential direction in the same angular phases as the first communication holes.

10. The negative pressure type booster device as set forth in claim 7, wherein:
    a filter element is provided in the secondary passage, and the filter element is smaller in air path resistance than the silencer.

* * * * *